US012350942B2

(12) United States Patent
Omura

(10) Patent No.: US 12,350,942 B2
(45) Date of Patent: Jul. 8, 2025

(54) LIQUID DISCHARGE APPARATUS, LIQUID DISCHARGE METHOD, AND STORAGE MEDIUM

(71) Applicant: Taito Omura, Kanagawa (JP)

(72) Inventor: Taito Omura, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 163 days.

(21) Appl. No.: 18/180,370

(22) Filed: Mar. 8, 2023

(65) Prior Publication Data

US 2023/0286286 A1 Sep. 14, 2023

(30) Foreign Application Priority Data

Mar. 14, 2022 (JP) ................................ 2022-039087

(51) Int. Cl.
*B41J 2/175* (2006.01)

(52) U.S. Cl.
CPC ................................ *B41J 2/17596* (2013.01)

(58) Field of Classification Search
CPC .. B41J 2/17596; B05B 13/0405; B05B 12/02; B05B 12/085; B05B 13/0431; B05B 1/3046; B05B 15/58
USPC ........................................................ 347/85
See application file for complete search history.

(56) References Cited

U.S. PATENT DOCUMENTS

2005/0185033 A1* 8/2005 Miki .................... B41J 2/17556 347/84
2006/0273189 A1* 12/2006 Grimm .................. A01G 25/16 239/146
2009/0206184 A1* 8/2009 Yan .................... F02M 61/1873 239/584
2013/0269578 A1 10/2013 Grimm et al.
2017/0348718 A1* 12/2017 Preheim ............... A01C 23/007
2020/0039217 A1 2/2020 Kaiba et al.

FOREIGN PATENT DOCUMENTS

| | | |
|---|---|---|
| EP | 0480080 | 4/1992 |
| EP | 1155748 | 11/2001 |
| JP | 2004-142382 | 5/2004 |
| JP | 2020-023177 | 2/2020 |
| WO | 2019/028345 | 2/2019 |
| WO | 2022/157214 | 7/2022 |

OTHER PUBLICATIONS

Extended European Search Report for 23161694.7 mailed on Jul. 10, 2023.

* cited by examiner

*Primary Examiner* — Jason S Uhlenhake
*Assistant Examiner* — Alexander D Shenderov
(74) *Attorney, Agent, or Firm* — IPUSA, PLLC

(57) ABSTRACT

A liquid discharge apparatus includes a liquid discharge head and circuitry. The liquid discharge head has a nozzle hole from which a liquid is discharged and includes a valve to open and close the nozzle hole and a valve driver to drive the valve. The circuitry causes the valve driver to drive the valve to open the nozzle hole for a valve opening time to discharge the liquid onto an object, and changes the valve opening time based on a head pressure applied to the liquid in the liquid discharge head.

5 Claims, 10 Drawing Sheets

COMPARATIVE EXAMPLE

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-039087, filed on Mar. 14, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing a plurality of instructions.

Related Art

In the related art, a liquid discharge apparatus includes a discharge head that discharges a liquid and applies the liquid to an object. Such a liquid discharge apparatus is used for various applications such as coating of the object and image formation on a recording medium.

SUMMARY

Embodiments of the present disclosure describe an improved liquid discharge apparatus that includes a liquid discharge head and circuitry. The liquid discharge head has a nozzle hole from which a liquid is discharged and includes a valve to open and close the nozzle hole and a valve driver to drive the valve. The circuitry causes the valve driver to drive the valve to open the nozzle hole for a valve opening time to discharge the liquid onto an object, and changes the valve opening time based on a head pressure applied to the liquid in the liquid discharge head.

According to other embodiments of the present disclosure, there are provided a liquid discharge method and a non-transitory storage medium storing a plurality of instructions which, when executed by one or more processors, causes the processors to perform the liquid discharge method. The method includes driving a valve to open and close the nozzle hole for a valve opening time to discharge a liquid onto an object, and changing the valve opening time based on a head pressure applied to the liquid to be discharged from the nozzle hole.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
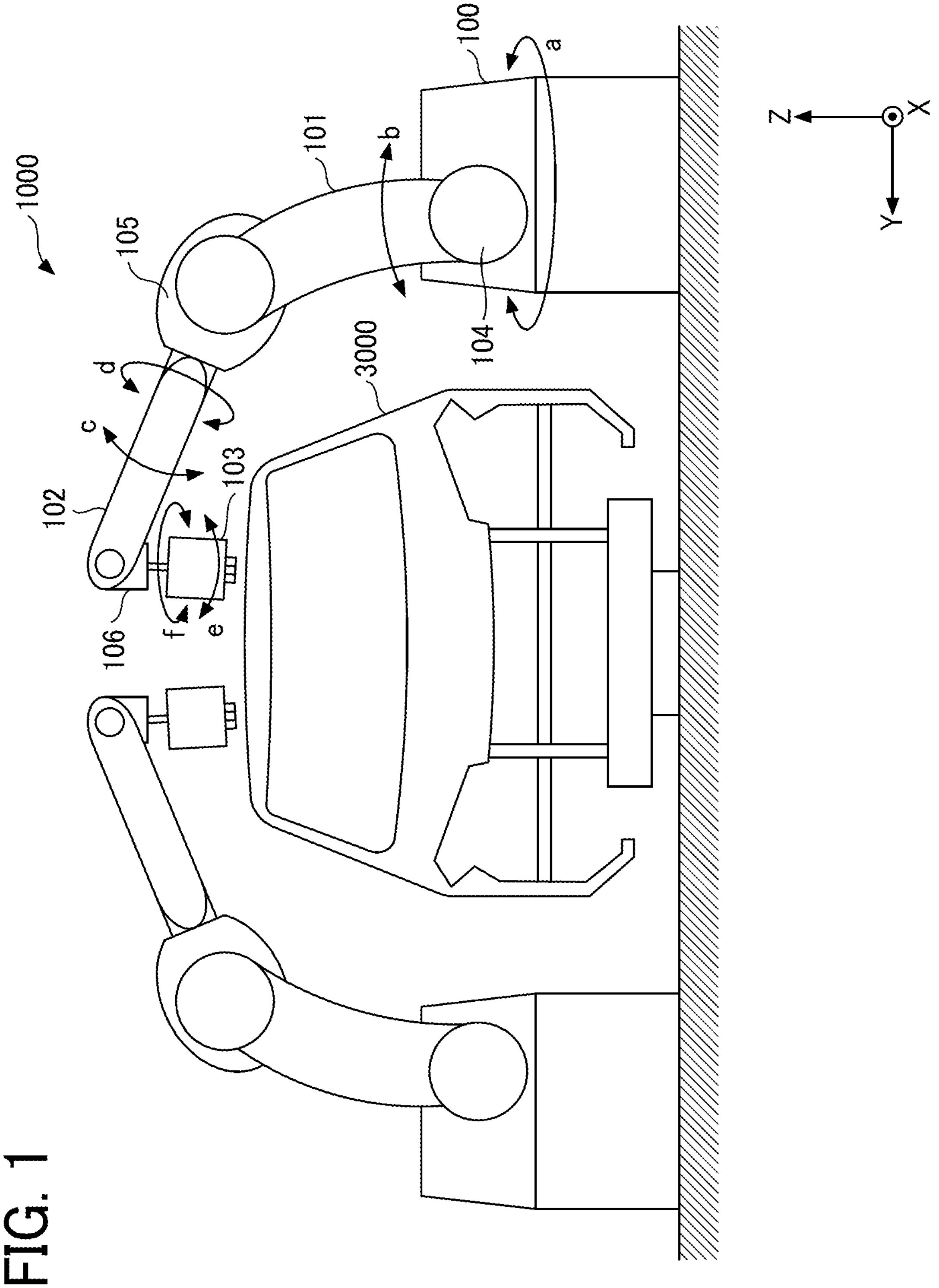
FIG. 1 is a schematic view of a coating robot including a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Outline of Liquid Discharge Apparatus

First, an outline of a liquid discharge apparatus is described with reference to FIG. 1. FIG. 1 is a schematic view illustrating an overall configuration of a liquid discharge apparatus according to an embodiment of the present disclosure. The liquid discharge apparatus illustrated in FIG. 1 is a coating robot 1000 that coats, for example, a body of an automobile. An X-axis direction, a Y-axis direction, and a Z-axis direction are indicated by arrows in FIG. 1, which are three directions intersecting with each other. The X-axis direction is, for example, a front-back direction of the body of the automobile which is an object 3000 to be coated. The Y-axis direction is a width direction of the body of the automobile. The Z-axis direction is the up-down direction in FIG. 1.

As illustrated in FIG. 1, the coating robot 1000 is installed so as to face the object 3000 such as a surface of the body of the automobile. The coating robot 1000 includes a base 100, a first arm 101, a second arm 102, and a head unit 103. The first arm 101 is coupled to the base 100. The second arm 102 is coupled to the first arm 101. The head unit 103 is coupled to the second arm 102.

The coating robot 1000 includes a first joint 104, a second joint 105, and a third joint 106. The first joint 104 couples the base 100 and the first arm 101. The second joint 105 couples the first arm 101 and the second arm 102. The third joint 106 couples the second arm 102 and the head unit 103.

The coating robot 1000 is, for example, a multi-articulated robot. The base 100 is rotatable in the direction indicated by arrow a about a rotation shaft extending in the Z-axis direction. The base 100 supports one end of the first arm 101 via the first joint 104. The first arm 101 is swingable in the direction indicated by arrow b about a rotation shaft parallel to an X-Y plane.

The other end of the first arm 101 supports one end of the second arm 102 via the second joint 105. The second arm 102 is swingable in the direction indicated by arrow c about a rotation shaft parallel to the X-Y plane. In addition, the second arm 102 is rotatable in the direction indicated by arrow d about a rotation shaft extending in the longitudinal direction of the second arm 102.

The other end of the second arm 102 supports the head unit 103 via the third joint 106. The head unit 103 is swingable in the direction indicated by arrow e about a rotation shaft extending in the direction intersecting the longitudinal direction of the second arm 102. In addition, the head unit 103 is rotatable in the direction indicated by arrow f about a rotation shaft extending in the direction from the third joint 106 toward the head unit 103.

The coating robot 1000 freely moves the head unit 103 relative to the object 3000. The coating robot 1000 accurately positions the head unit 103 relative to the object 3000. The coating robot 1000 accurately positions the head unit 103 at a coating position for coating the object 3000. The coating robot 1000 discharges paint toward the object 3000 to coat the object 3000 with the paint.

In the present embodiment, a system configuration in which one coating robot 1000 is disposed on each side of the object 3000 is illustrated in FIG. 1, but the coating robot 1000 is not limited to being disposed on each side of the object 3000. The number of coating robots 1000 installed may be one, or three or more with respect to the object 3000.

Figure 2:
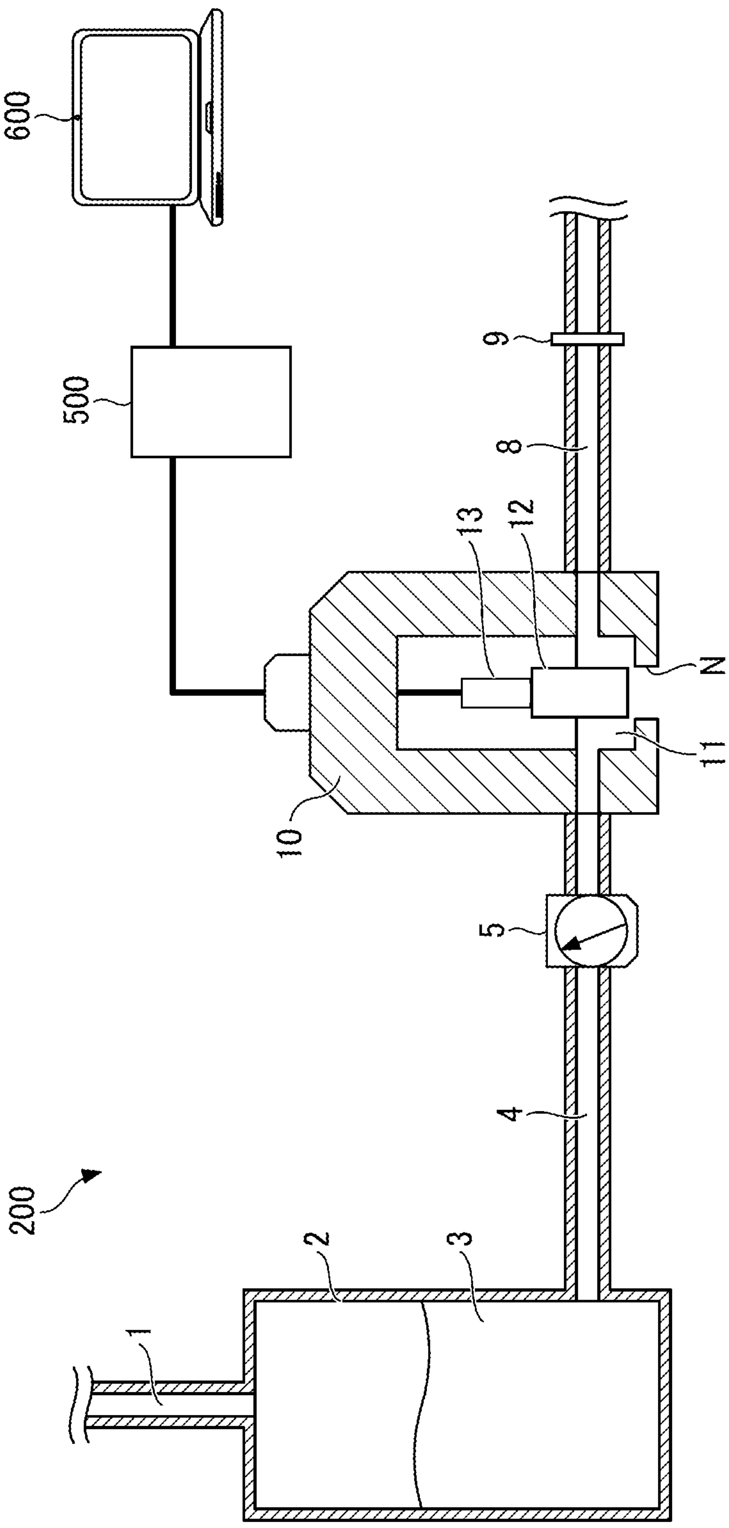
FIG. 2 is a schematic view of the liquid discharge apparatus according to the present embodiment.

FIG. 2 is a schematic view of a liquid discharge apparatus 200. The coating robot 1000 includes the liquid discharge apparatus 200. The liquid discharge apparatus 200 performs a liquid discharge method. The liquid discharge apparatus 200 includes a tank 2, a discharge head (liquid discharge head) 10, and a controller 500. For example, the liquid discharge apparatus 200 is accommodated in the head unit 103 illustrated in FIG. 1, or at least the discharge head 10 of the liquid discharge apparatus 200 may be accommodated in the head unit 103.

The liquid discharge apparatus 200 includes a pipe 1, a pipe 4, and a pipe 8. The liquid discharge apparatus 200 includes a pressure sensor 5 that detects a pressure applied to a liquid (i.e., a liquid pressure) in the discharge head 10 as a head pressure. The tank 2 is a container that stores a liquid to be supplied to the discharge head 10. The tank 2 stores paint 3 which is an example of the liquid. The pipe 1 is connected to the tank 2. For example, a compressor is connected to the pipe 1. The compressor supplies pressurized air to the tank 2. The compressor can increase the pressure inside the tank 2 via the pipe 1. The pipe 1 functions as a pressure supply path that applies a pressure to the paint 3 (liquid) in the tank 2. The pipe 4 is a channel connecting the tank 2 and the discharge head 10. The paint 3 in the tank 2 flows through the pipe 4 and is supplied to the discharge head 10. The pipe 4 functions as a liquid supply channel that supplies the paint 3 to the discharge head 10.

The discharge head 10 has a nozzle hole N and includes a liquid chamber 11 and a valve 12. The discharge head 10 further includes a valve driver 13 that drives the valve 12. The nozzle hole N communicates with the liquid chamber 11. The liquid chamber 11 stores the paint 3 supplied from the tank 2. The valve 12 is disposed in the liquid chamber 11. The valve 12 opens and closes the nozzle hole N. The valve 12 is, for example, a needle valve. The discharge head 10 discharges the paint 3 in the liquid chamber 11 from the nozzle hole N. The discharge head 10 discharges the pressurized paint 3 to apply the paint 3 to the object 3000. The valve driver 13 drives (opens and closes) the valve 12 in accordance with a drive signal transmitted from a controller 500. The valve 12 approaches the nozzle hole N to close the nozzle hole N. The valve 12 moves away from the nozzle hole N to open the nozzle hole N. The controller 500 and a personal computer (PC) 600 control liquid discharge by the discharge head 10. The controller 500 and the PC 600 operate the valve 12 to discharge the paint 3.

The pipe 8 communicates with the discharge head 10. The pipe 8 includes a valve 9. When the liquid chamber 11 is filled with the paint 3, the valve 9 is opened to release the pressure in the liquid chamber 11. When the paint 3 is discharged from the nozzle hole N of the discharge head 10, the valve 9 is closed.

The pressure sensor 5 is disposed, for example, in the pipe 4. The pressure sensor 5 is disposed, for example, in the vicinity of the liquid chamber 11 of the discharge head 10. The pressure sensor 5 outputs data on the detected liquid pressure of the paint 3 to the controller 500. The controller 500 detects the liquid pressure of the paint 3 to be supplied to the discharge head 10 based on the data received from the pressure sensor 5. Alternatively, the controller 500 may calculate the liquid pressure applied to the paint 3 in the discharge head 10 (i.e., the head pressure). When the liquid pressure in the discharge head 10 changes, the liquid pressure of the paint 3 to be supplied to the discharge head 10 also changes.

Configuration of Discharge Head

Figure 3:
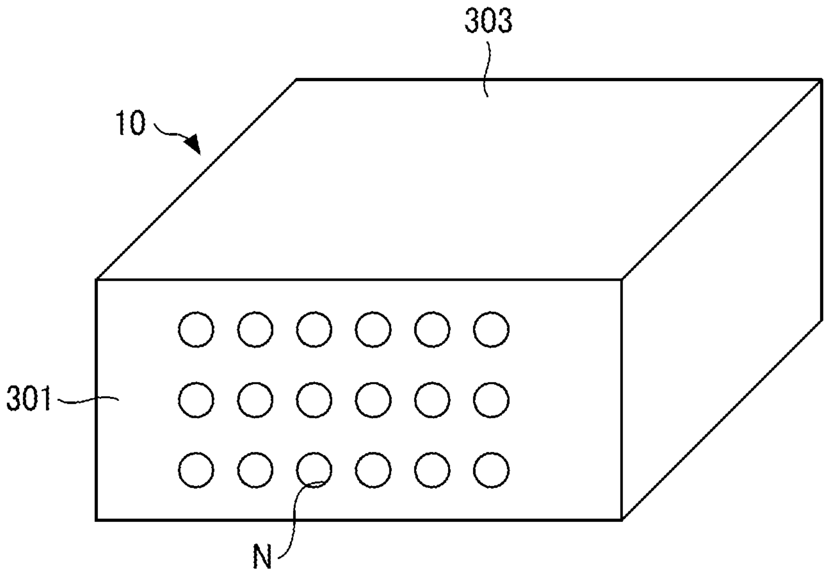
FIG. 3 is a schematic perspective view of a discharge head of the liquid discharge apparatus according to the present embodiment.

A schematic configuration of the discharge head 10 is described below with reference to FIG. 3. FIG. 3 is a schematic perspective view of the discharge head 10 according to the present embodiment. The discharge head 10 illustrated in FIG. 3 is a valve inkjet head. The discharge head 10 includes a housing 303 and has a nozzle face 301 and the nozzle hole N.

The nozzle face 301 is one of surfaces of the housing 303. Multiple nozzle holes N from which the paint 3 (liquid) is discharged are disposed on the nozzle face 301. The nozzle hole N is a minute opening. As described above, the valve driver 13 drives the valve 12 to open and close the nozzle hole N. When the nozzle hole N is opened, the discharge head 10 discharges the paint 3 from the nozzle hole N. For example, the housing 303 accommodates the valve driver 13.

The nozzle face 301 having the nozzle holes N may be formed on a nozzle plate that is a separate component from the housing 303. The housing 303 may include the nozzle plate having the nozzle face 301. The number of the nozzle holes N may be, for example, 18 as illustrated in FIG. 3 or more than 18. The multiple nozzle holes N may be arranged in one row or multiple rows. The number of the nozzle holes N is not limited to two or more and may be one. The liquid discharge apparatus 200 may include multiple discharge heads 10 each having one nozzle hole N. For example, when a valve opening time during which the valve 12 opens the nozzle hole N is changed, the discharge head 10 including one nozzle hole N can be used.

Hardware Configuration

Figure 4:
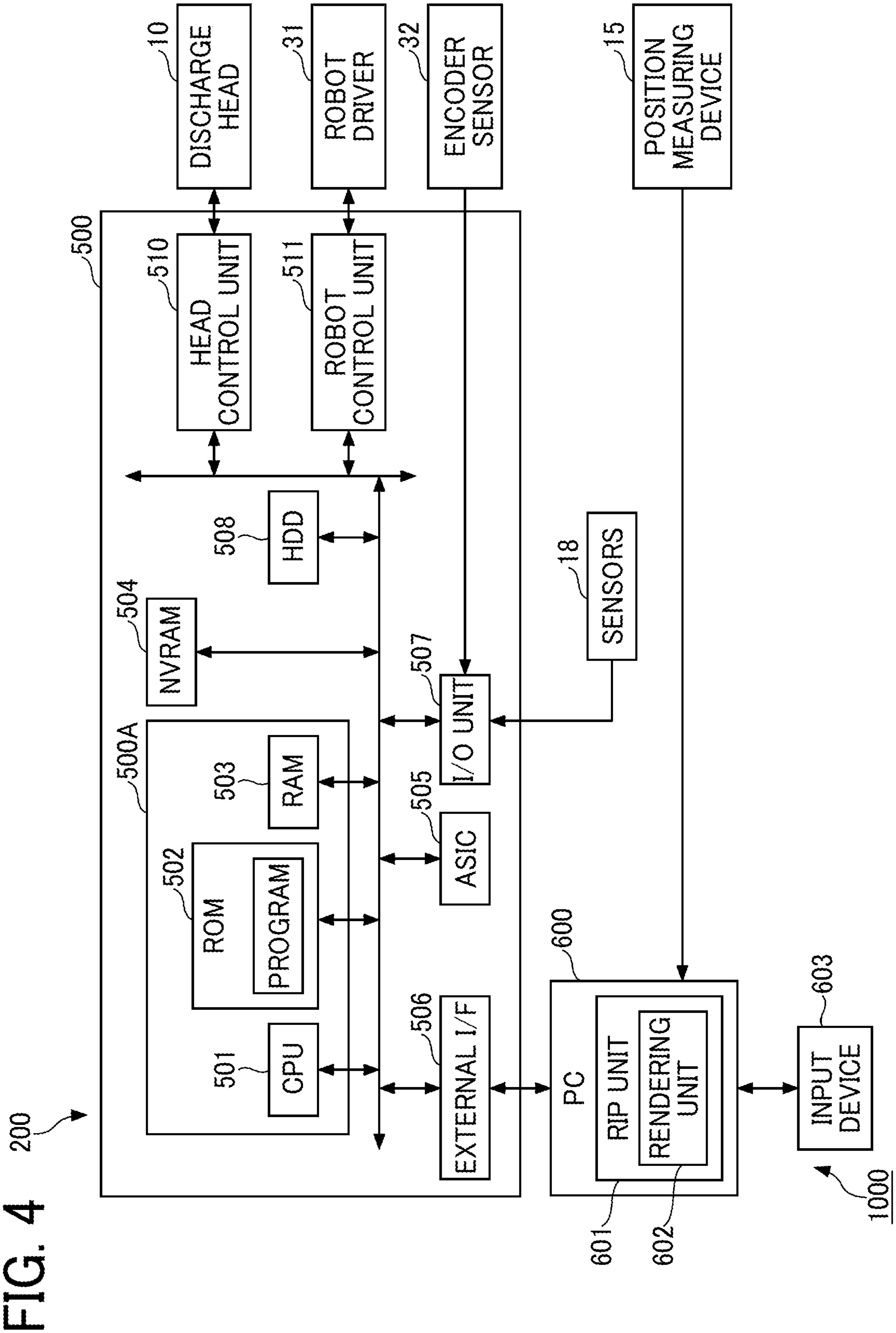
FIG. 4 is a block diagram illustrating a hardware configuration of the liquid discharge apparatus according to the present embodiment.

A description is given below of a hardware configuration of the liquid discharge apparatus 200 according to the present embodiment with reference to FIG. 4. FIG. 4 is a block diagram illustrating the hardware configuration of the liquid discharge apparatus 200 according to the present embodiment. The hardware configuration illustrated in FIG. 4 may include additional components if desired. The hardware configuration may not include the components illustrated in FIG. 4 if desired.

The liquid discharge apparatus 200 includes the controller 500. The controller 500 includes a central processing unit (CPU) 501, a read only memory (ROM) 502, a random access memory (RAM) 503, a non-volatile random access memory (NVRAM) 504, and a hard disk drive (HDD) 508. The CPU 501 controls the entire liquid discharge apparatus 200.

The ROM 502 stores various programs for causing the CPU 501 to control the liquid discharge and various data for coating. A program for scanning the discharge head 10 is stored in the ROM 502. The RAM 503 temporarily stores data such as a position of the discharge head 10. The NVRAM 504 is a non-volatile memory and can retain data even while a power supply of the liquid discharge apparatus 200 is shut off.

The controller 500 includes a main controller 500A, and the main controller 500A includes the CPU 501, the ROM 502, and the RAM 503. The controller 500 includes an application specific integrated circuit (ASIC) 505. The ASIC 505 processes input and output signals for controlling the entire liquid discharge apparatus 200. The ASIC 505 performs various kinds of signal processing on image data. The ASIC 505 also performs image processing on images input to the controller 500. The controller 500 includes an external interface (I/F) 506 for transmitting and receiving data to and from the PC 600 which is an example of an external device.

The PC 600 includes, for example, a raster image processor (RIP) unit 601. The RIP unit 601 includes a rendering unit 602. An input device 603 is connected to the PC 600. A position measuring device 15 is also connected to the PC 600. The memories such as the ROM 502, the RAM 503, the NVRAM 504, and the HDD 508 store the image date and date on a coating area received from the PC 600. The data on the coating area includes data such as the size of the object 3000 to be coated.

The controller 500 further includes an input/output (I/O) unit 507 for receiving detection signals output from the sensors 18. The sensors 18 include the pressure sensor 5 illustrated in FIG. 2.

The controller 500 further includes a head control unit 510 that controls driving of the discharge head 10. The head control unit 510 controls a driver of the discharge head 10. The head control unit 510 controls the driver of the discharge head 10 to causes the discharge head 10 to discharge the paint 3 (liquid). The head control unit 510 controls driving of the valve 12 of the discharge head 10. The discharge head 10 controls the pressure in the tank 2. The discharge head 10 controls driving of the valve 9. The head control unit 510 executes various types of controls related to the discharge head 10.

The controller 500 further includes a robot control unit 511. The robot control unit 511 controls a robot driver 31 in accordance with a command from the CPU 501. The coating robot 1000 includes the robot driver 31. The robot driver 31 includes, for example, a motor. The robot driver 31 drives the rotation shaft of the base 100. Similarly, the robot driver 31 drives the rotation shaft of the first arm 101, the rotation shaft of the second arm 102, the rotation shaft of the head unit 103, the rotation shaft of the first joint 104, the rotation shaft of the second joint 105, and the rotation shaft of the third joint 106.

The coating robot 1000 includes an encoder sensor 32. The controller 500 receives a signal from the encoder sensor 32 via the I/O unit 507. The encoder sensor 32 is provided for each of the first joint 104, the second joint 105, and the third joint 106. Each of the first joint 104, the second joint 105, and the third joint 106 includes a slit that rotates together with the rotation shaft. The encoder sensor 32 optically detects the slit. The encoder sensor 32 detects rotation angles of the first joint 104, the second joint 105, and the third joint 106.

The coating robot 1000 includes the position measuring device 15. The position measuring device 15 measures the position of the discharge head 10. Examples of the position measuring device 15 include a three-dimensional (3D) sensor and a 3D camera. The position measuring device 15 measures the position of the discharge head 10 in the X and Y directions. The position measuring device measures an inclination of the discharge head 10. The position measuring device 15 detects a coating start position to start coating. The position measuring device 15 may detect the size of the object 3000 to be coated.

The position measuring device 15 may include a laser displacement meter. The position measuring device 15 can measure a length of the object 3000 in the Z-axis direction. The position measuring device 15 may measure a height position of a roof of the object 3000. The position measuring device 15 outputs the measurement result to the PC 600. The position measuring device 15 detects a curvature of the object 3000.

The PC 600 acquires position data of the discharge head 10 from the position measuring device 15. The controller 500 receives the position data of the discharge head 10 via the PC 600. The controller 500 may receive data from the position measuring device 15 via the I/O unit 507. The input device 603 is connected to the PC 600. The input device 603 can input image data and position data to the PC 600. The position measuring device 15 may input data of the measured position of the discharge head 10 to the PC 600.

The PC 600 generates a coating route for the coating robot 1000. The rendering unit 602 decomposes coating data of a coating portion into scan data for each scan. The coating portion is, for example, the coating area to be coated on a surface of the object 3000. The rendering unit 602 determines the number of nozzles to be driven among multiple nozzle holes N of the discharge head 10 in each scan and whether to perform dummy discharge. The number of nozzles to be driven is the number of nozzle holes N from which the paint 3 (liquid) is discharged by the discharge head 10. In the dummy discharge, the discharge head 10 discharges the paint 3 (liquid) from the nozzle holes N before being scanned. The rendering unit 602 determines whether to perform the dummy discharge.

The liquid discharge apparatus 200 determines the valve opening time during scan. A valve opening time control unit 231 of the liquid discharge apparatus 200 determines the valve opening time during scan in accordance with data on a print time corresponding to the number of nozzles to be driven, which has been created in advance. The data on the print time corresponding the number of nozzles to be driven is determined in advance based on pressure fluctuations of the paint 3 (liquid). The "pressure fluctuation of the paint 3" is, for example, fluctuations of the liquid pressure in the discharge head 10.

The PC 600 includes the RIP unit 601. The RIP unit 601 performs image processing in accordance with a color profile and user setting. The RIP unit 601 includes the rendering unit 602. The rendering unit 602 decomposes the coating data of the coating portion for the object 3000 into the scan data (image data) for each scan (e.g., for each movement of the discharge head 10 in the main scanning direction). The object 3000 is, for example, the body of the automobile. The term "each scan" means, for example, each movement of the discharge head 10 in the main scanning direction. The "main scanning direction" may be, for example, the same as the longitudinal direction of the object 3000 or may be an arbitrary direction.

The input device 603 is connected to the PC 600. A user can input various data to the PC 600 with the input device 603. The PC 600 receives image data and coordinate data indicating the coating area of the object 3000 to be coated via the input device 603. The PC 600 receives a signal from the input device 603 to set a coating mode. The user can select the coating mode by operating the input device 603. The PC 600 receives a signal from the input device 603 to set the coating area. The PC 600 sets the coating start position and a coating end position. The PC 600 sets a start timing of coating. The user can change various settings by operating the PC 600 via the input device 603.

The input device 603 includes, for example, a keyboard, a mouse, a touch panel, and the like. The PC 600 acquires the position data of the discharge head 10 from the position measuring device 15 of the coating robot 1000. The PC 600 generates the coating route of the discharge head 10 based on the acquired position data. The coating route includes the position data on a movement route along which the discharge head 10 moves. The coating route may include other data.

A coating system is an example of a liquid discharge system. The coating system includes the liquid discharge apparatus 200 and the PC 600.

Functional Configuration

Figure 5:
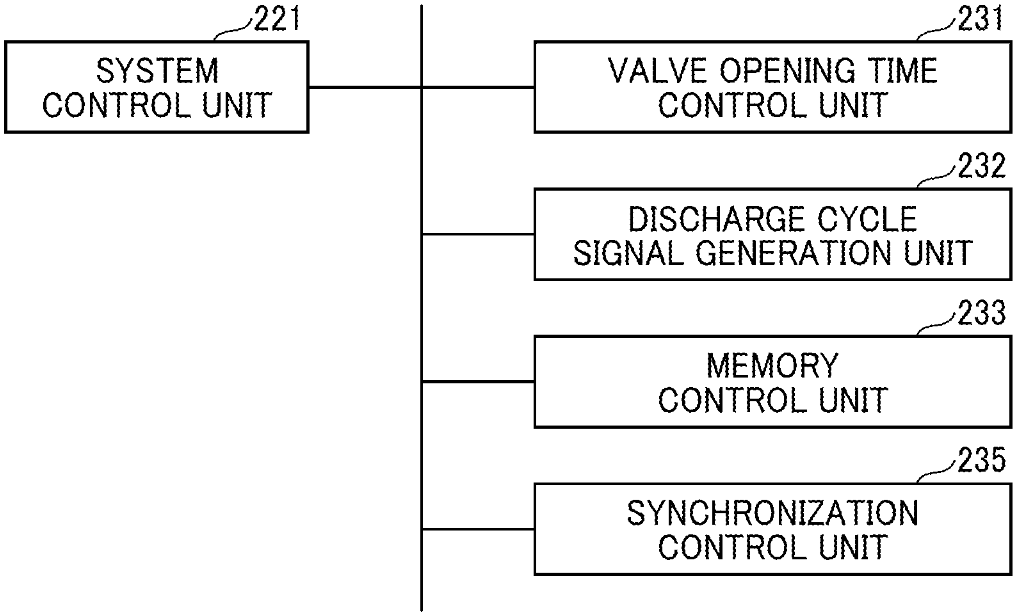
FIG. 5 is a functional block diagram of the liquid discharge apparatus according to the present embodiment.

A description is given below of a functional configuration of the liquid discharge apparatus 200 according to the present embodiment with reference to FIG. 5. FIG. 5 is a functional block diagram of the liquid discharge apparatus 200 according to the present embodiment. The CPU 501 illustrated in FIG. 3 executes programs stored in a storage unit such as the ROM 502 to implements functions of a system control unit 221, the valve opening time control unit 231, a discharge cycle signal generation unit 232, a memory control unit 233, and a synchronization control unit 235 illustrated in FIG. 5.

The system control unit 221 controls an entire operation of the coating system. The system control unit 221 receives the image data of the coating area and the command signal from the PC 600 and controls the entire operation of the coating system.

The valve opening time control unit 231 controls the valve opening time of the valve 12. The valve opening time is a length of time during which the valve 12 opens the nozzle hole N and the paint 3 (liquid) can be discharged.

The memory control unit 233 controls the memories such as the ROM 502, the RAM 503, the NVRAM 504, and the HDD 508.

The discharge cycle signal generation unit 232 generates a discharge cycle signal based on an output signal output from the encoder sensor 32 and data indicating the resolution of the image data output from the PC 600. The discharge cycle signal indicates a discharge cycle of the paint 3 discharged from the nozzle hole N.

The synchronization control unit 235 synchronizes the movement of the multiple coating robots 1000 with the discharge operation of the paint 3 by the discharge head 10 based on the image data, coating instruction signals, and the like received from the PC 600.

The head control unit 510 receives the discharge cycle signal and controls the discharge operation of the paint 3 (liquid) by the discharge head 10 based on the received discharge cycle signal. The robot control unit 511 receives a synchronization control signal and controls the robot driver 31 based on the received synchronization control signal. The controller 500 controls the robot driver 31 to move the first arm 101, the second arm 102, and the head unit 103 to desired positions.

The system control unit 221, the valve opening time control unit 231, the discharge cycle signal generation unit 232, the memory control unit 233, and the synchronization control unit 235 can be implemented by software such as a program stored in the storage unit. All or some of the system control unit 221, the valve opening time control unit 231, the discharge cycle signal generation unit 232, the memory control unit 233, and the synchronization control unit 235 may be implemented by hardware such as an integrated circuit (IC).

The program may be recorded in a computer-readable storage medium such as a compact disc read only memory (CD-ROM) or a flexible disk (FD) as file data in an installable or an executable format, and may be loaded into the liquid discharge apparatus 200 via such a storage medium.

Alternatively, the program may be recorded in a computer-readable storage medium such as a compact disc-recordable (CD-R), a digital versatile disc (DVD), a Blu-ray (registered trademark) disc, or a semiconductor memory, and may be loaded into the liquid discharge apparatus 200 via such a storage medium. The program to be installed may be downloaded into the liquid discharge apparatus 200 via a network such as the Internet. The program may be incorporated in the ROM 502 or the like in the liquid discharge apparatus 200 in advance.

The controller 500 may implement the functions by the PC 600. Similarly, the PC 600 may implement the functions by the controller 500.

Comparative Example

A comparative example is described below. A liquid discharge apparatus according to the comparative example has a valve inkjet nozzle from which paint (liquid) is discharged when a valve opens the nozzle. In the liquid discharge apparatus according to the comparative example, the liquid pressure of the paint drops by a pressure loss due to discharge of the paint as a liquid. Accordingly, a discharge amount of the paint discharged from the discharge head decreases immediately after a start of coating or until the liquid pressure reaches an equilibrium when the number of nozzles to be driven is changed. When the discharge amount of the paint by the discharge head decreases, the coating quality may deteriorate.

Temporal Changes in Liquid Pressure in Discharge Head and Discharge Amount

Figure 6:
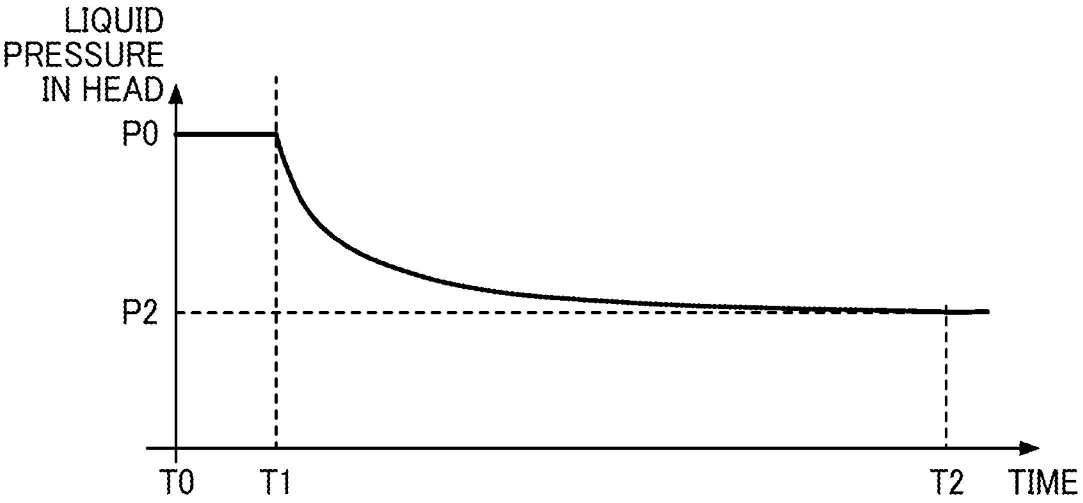
FIG. 6 is a graph illustrating a change in a liquid pressure in the discharge head over time.
Figure 7:
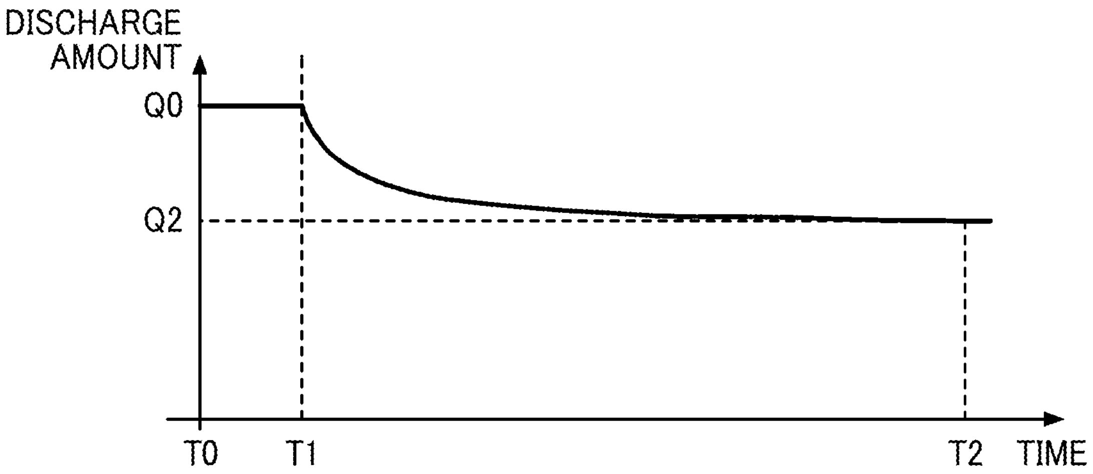
FIG. 7 is a graph illustrating a change in a discharge amount of liquid discharged from the discharge head over time.

With reference to FIGS. 6 and 7, a description is given below of an example of temporal changes in the liquid pressure of the paint in the discharge head and the discharge amount of the paint discharged from the discharge head when the paint is discharged by the discharge head having the valve inkjet nozzle. The "liquid pressure of the paint in the discharge head" may be abbreviated as the "liquid pressure in the head" or the "liquid pressure." FIG. 6 is a graph illustrating the change in the liquid pressure in the head over time. FIG. 7 is a graph illustrating the change in the discharge amount of the paint over time. In FIG. 6, the horizontal axis represents time, and the vertical axis represents the liquid pressure in the head. In FIG. 7, the horizontal axis represents time, and the vertical axis represents the discharge amount.

A time T0 is a time before the discharge head starts discharging the paint. A time T1 is a discharge start time at which the discharge head starts discharging the paint. In the discharge head, the paint is pressurized at a constant supply pressure, and the paint is discharged from the nozzle hole N when the valve opens the nozzle hole N. As a result, the liquid pressure in the head starts decreasing from a pressure P0 at the same time the discharge head starts discharging (i.e., a start of discharge) and approaches a pressure P2. This is because it takes a certain amount of time until the liquid pressure in a system including such a discharge head reaches a new equilibrium. The liquid pressure in the head remains lowered until the system including the discharge head reaches the new equilibrium. Accordingly, as illustrated in FIG. 7, the discharge amount decreases from a discharge amount Q0 immediately after the start of discharge and approaches a discharge amount Q2 in the comparative example. As a result, the coating quality may become unstable and deteriorate. Immediately after the time T1, the liquid pressure in the head and the discharge amount decrease.

Figure 8:
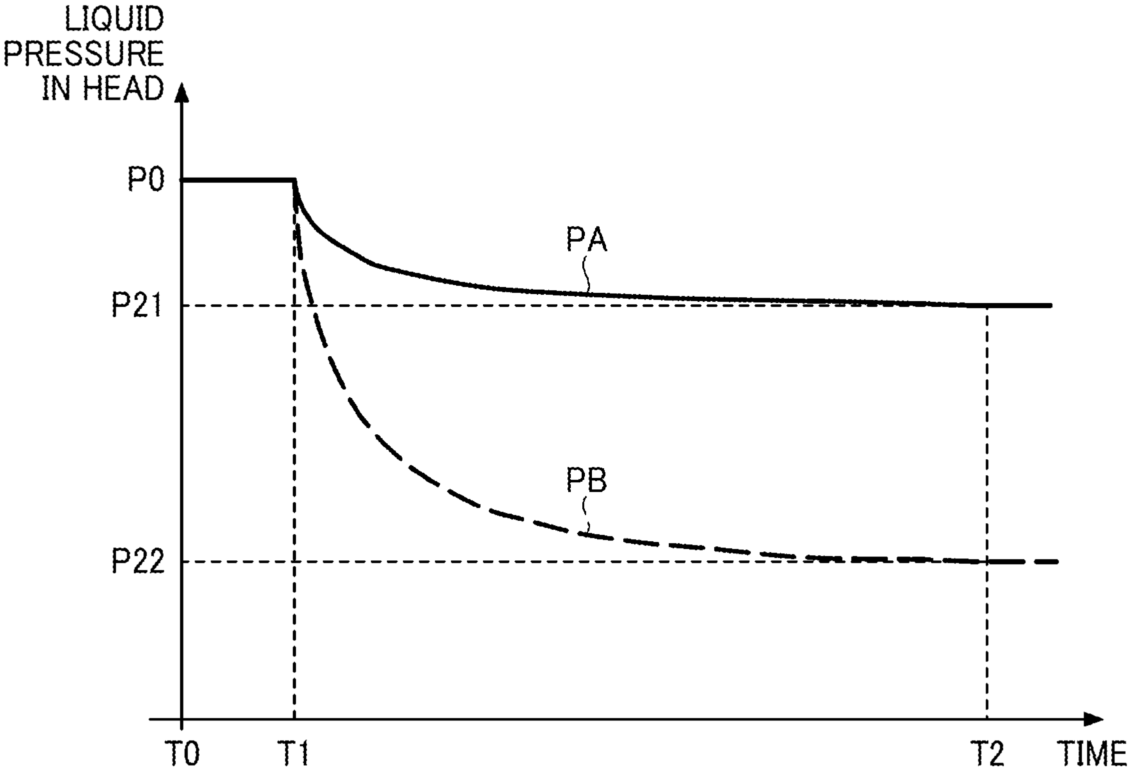
FIG. 8 is a graph illustrating the change in the liquid pressure in the discharge head, illustrating a difference depending on the number of nozzles to be driven.

Temporal Change in Liquid Pressure in Head Depending on Number of Nozzles to be Driven With reference to FIG. 8, a description is given below of the temporal change in the liquid pressure in the head depending on the number of nozzles to be driven. FIG. 8 is a graph illustrating the change in the liquid pressure in the head over time, illustrating a difference depending on the number of nozzles to be driven. In FIG. 8, the horizontal axis represents time, and the vertical axis represents the liquid pressure in the head.

FIG. 8 illustrates the change in the liquid pressure in the head due to the increase or decrease in the number of nozzles to be driven when the discharge head having multiple valve inkjet nozzles is used. A liquid pressure in the head PA corresponds to when the number of nozzles to be driven is small, and a liquid pressure in the head PB corresponds to when the number of nozzles to be driven is large. When the number of nozzles to be driven is large, the pressure loss due to the discharge of the paint is larger than when the number of nozzles to be driven is small.

For example, at the discharge start time T1, both the liquid pressure in the head PA and the liquid pressure in the head PB are equal to the pressure P0, but the difference between the liquid pressure in the head PA and the liquid pressure in the head PB increases with time. At a time T2 after a certain period has elapsed, the liquid pressure in the head PA becomes a first pressure P21, and the liquid pressure in the head PB becomes a second pressure P22. The second pressure P22 is lower than the first pressure P21. The discharge amount under the second pressure P22 is smaller than the discharge amount under the first pressure P21. The decrease in the discharge amount under the liquid pressure in the head PA when the number of nozzles to be driven is small is smaller than the decrease in the discharge amount under the liquid pressure in the head PB when the number of nozzles to be driven is large.

Accordingly, when the number of nozzles to be driven is switched to a different number at the time T2, the coating quality becomes unstable due to the difference in the discharge amount.

Drive Voltage Waveform

Figure 9:
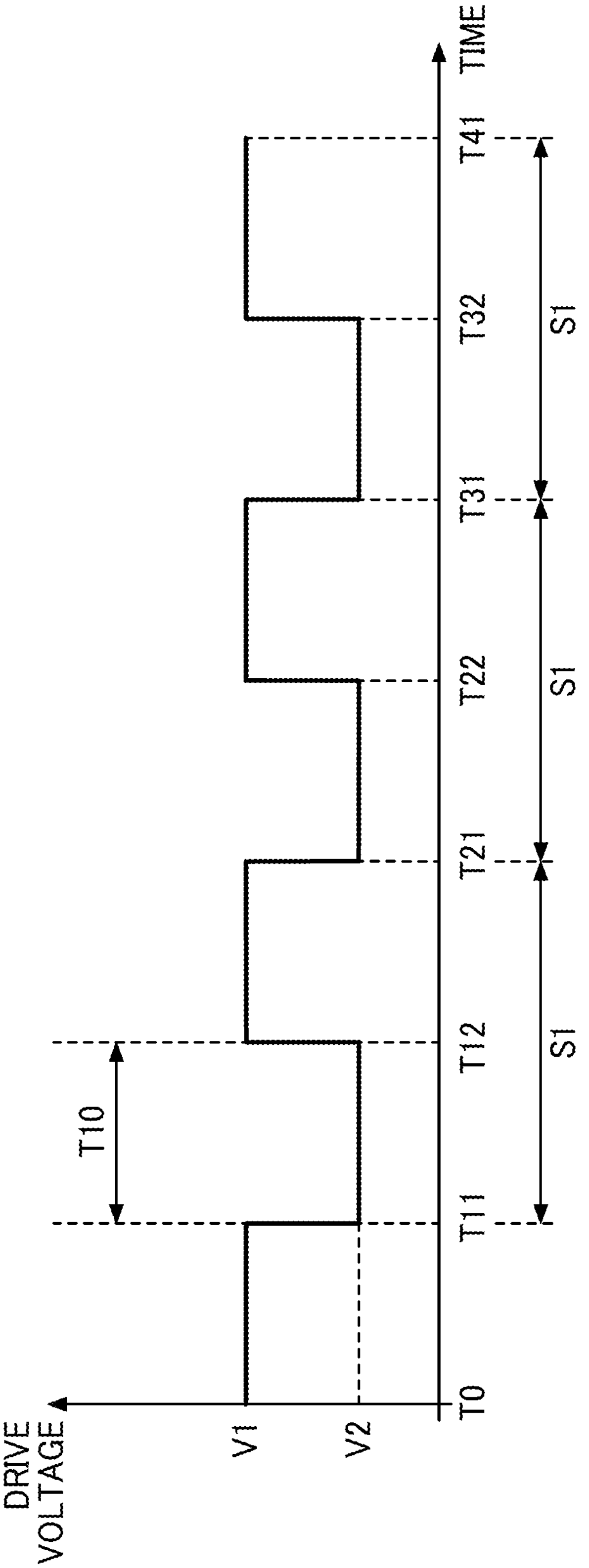
FIG. 9 is a diagram illustrating an example of a drive waveform applied to the discharge head.

A drive waveform applied to the discharge head 10 (the valve driver 13) is described with reference to FIG. 9. FIG. 9 is a diagram illustrating an example of the drive waveform. In FIG. 9, the horizontal axis represents time, and the vertical axis represents drive voltage. Time passes in the order of times T11, T12, T21, T22, T31, T32, and T41. A period from the time T11 to the time T21 is one drive cycle S1. Similarly, a period from the time T21 to the time T31 is one drive cycle S1, and a period from the time T31 to the time T41 is one drive cycle S1.

The drive voltage changes between a first drive voltage V1 and a second drive voltage V2. In one drive cycle S1, the drive voltage changes from the second drive voltage V2 to the first drive voltage V1. For example, the valve 12 closes the nozzle hole V (i.e., closed state) at the first drive voltage V1, the valves 12 opens the nozzle hole N (i.e., open state) to discharge the paint 3 (liquid) from the nozzle hole N at the second drive voltage V2. In one drive cycle S1, a length of time T10 during which the second drive voltage V2 is maintained is the valve opening time.

For example, the second drive voltage V2 is maintained from the time T11 to the time T12, and the valve 12 opens the nozzle hole N. The length of time T10 from the time T11 to the time T12 is the valve opening time. At the time T12, the drive voltage is changed from the second drive voltage V2 to the first drive voltage V1, and the valve 12 closes the nozzle hole N. The first drive voltage V1 is maintained from the time T12 to the time T21, and the valve 12 closes the nozzle hole N.

At the time T21, the drive voltage is changed from the first drive voltage V1 to the second drive voltage V2, and the valve 12 opens the nozzle hole N. Thus, the valve 12 opens and closes the nozzle hole N once from time T11 to time T21 (i.e., in one drive cycle S1). The valve opening time control unit 231 of the controller 500 sets the valve opening time between a minimum of 0 seconds and a maximum of one drive cycle S1. The valve opening time control unit 231 can change the valve opening time for each drive cycle S1.

Relation Between Valve Opening Time and Discharge Amount

Figure 10:
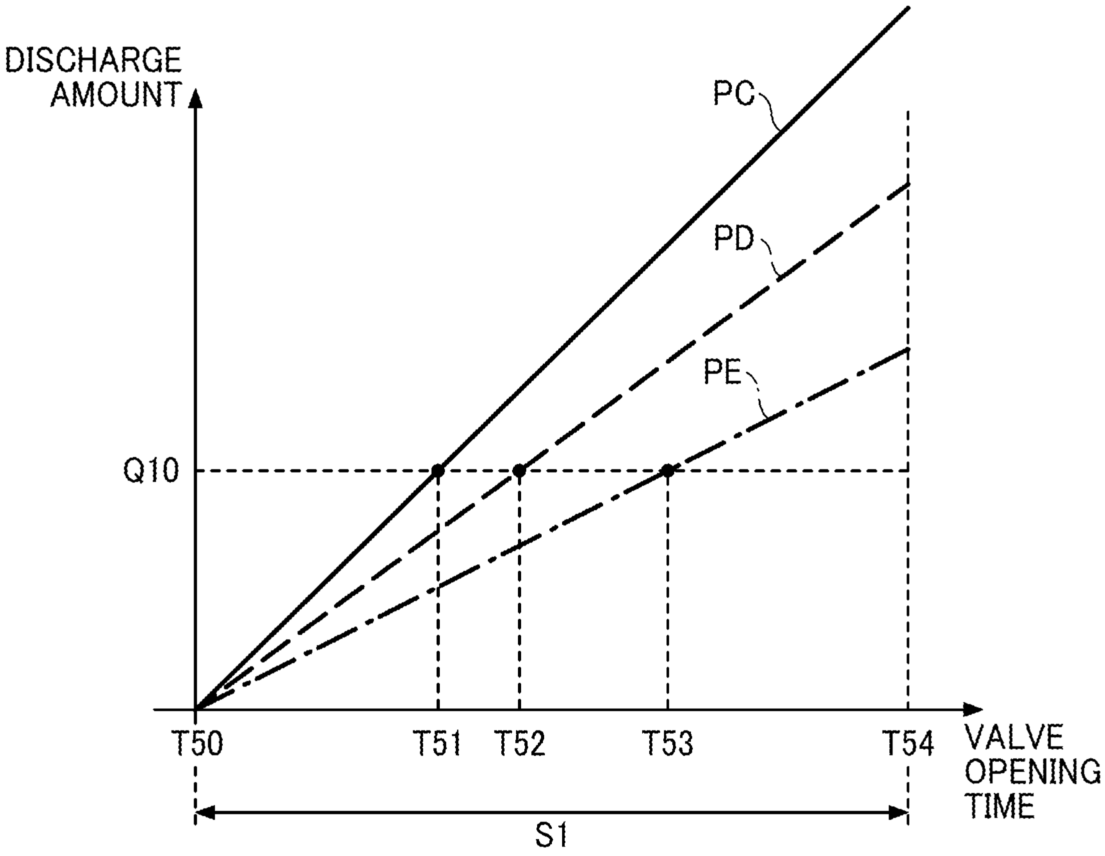
FIG. 10 is a graph illustrating a relation between a valve opening time and the discharge amount.

A relation between the valve opening time and the discharge amount is described with reference to FIG. 10. FIG. 10 is a graph illustrating the relation between the valve opening time and the discharge amount. In FIG. 10, the horizontal axis represents the length of the valve open time, and the vertical axis represents the discharge amount of the paint 3 discharged from the nozzle hole N.

FIG. 10 illustrates the relation between the valve opening time and the discharge amount for different liquid pressures PC, PD and PE. The liquid pressures PE, PD, and PC increase in this order. Among the liquid pressures PC, PD, and PE, the liquid pressure PC is the highest and the liquid pressure PE is the lowest. At the same liquid pressure, the discharge amount of the paint 3 discharged from the nozzle hole N is proportional to the valve opening time. At the same liquid pressure, the discharge amount increases with an increase in the valve opening time. Increase rates of the discharge amounts at the liquid pressures PE, PD, and PC increase in this order. The increase rate of the discharge amount at the liquid pressure PC is larger than the increase rate of the discharge amount at the liquid pressures PD and PE. The slope of the graph illustrated in FIG. 10 is largest at the liquid pressure PC and smallest at the liquid pressure PE.

The memory of the controller 500 stores data regarding changes in the discharge amount at different liquid pressures. The valve opening time control unit 231 of the controller 500 sets the valve opening time for each liquid pressure to make the discharge amount the same. The valve opening time control unit 231 sets different valve opening times T51, T52, and T53 for the liquid pressures PC, PD, and PE, respectively, to set the same discharge amount Q10. Among the times T51, T52, and T53, the time T51 is the shortest and the time T53 is the longest.

Examples of Liquid Pressure in Head, Valve Opening Time, and Discharge Amount

Figure 11:
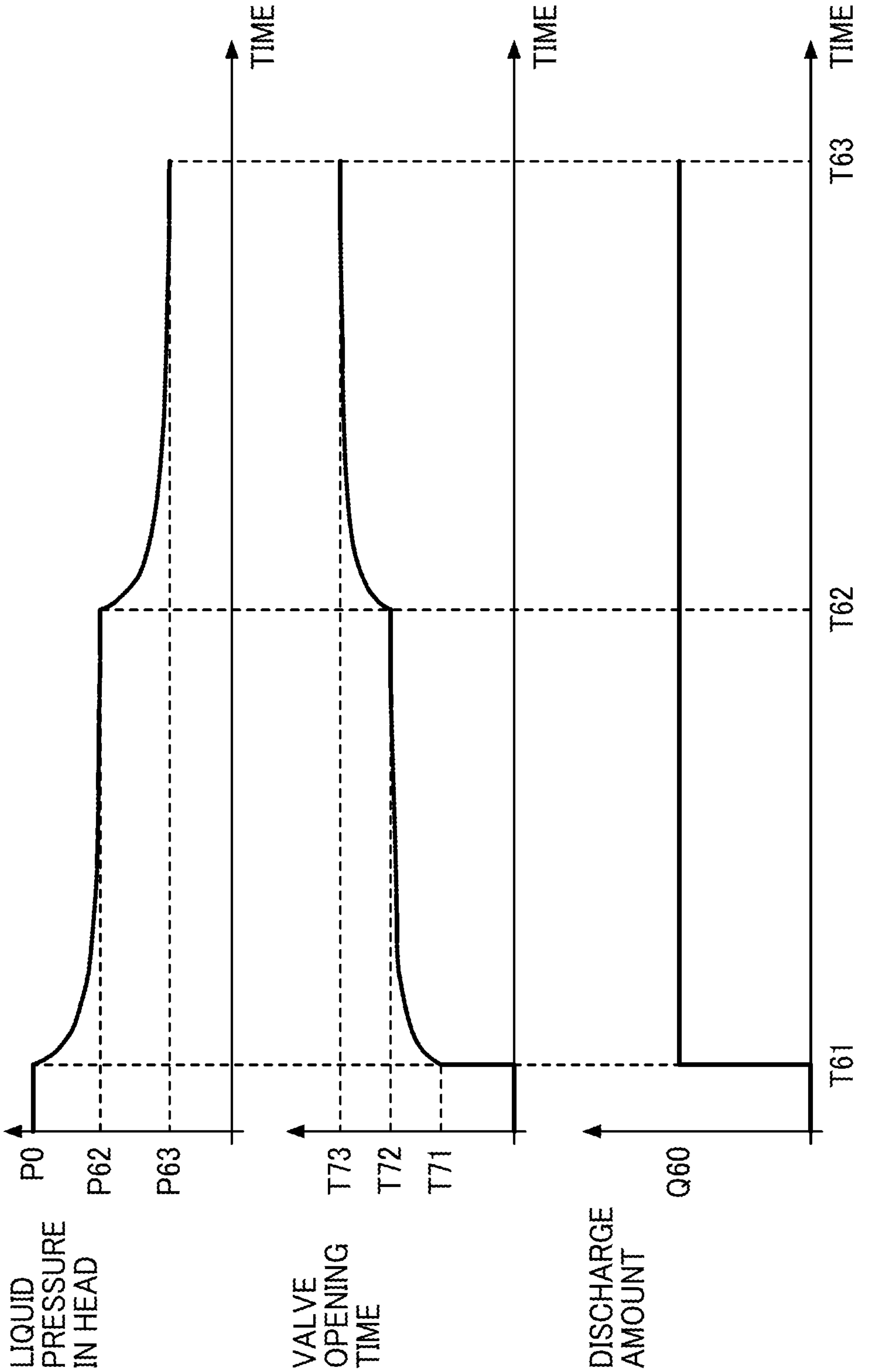
FIG. 11 is graphs illustrating an example of the liquid pressure in the discharge head, the valve opening time, and the discharge amount.
Figure 12:
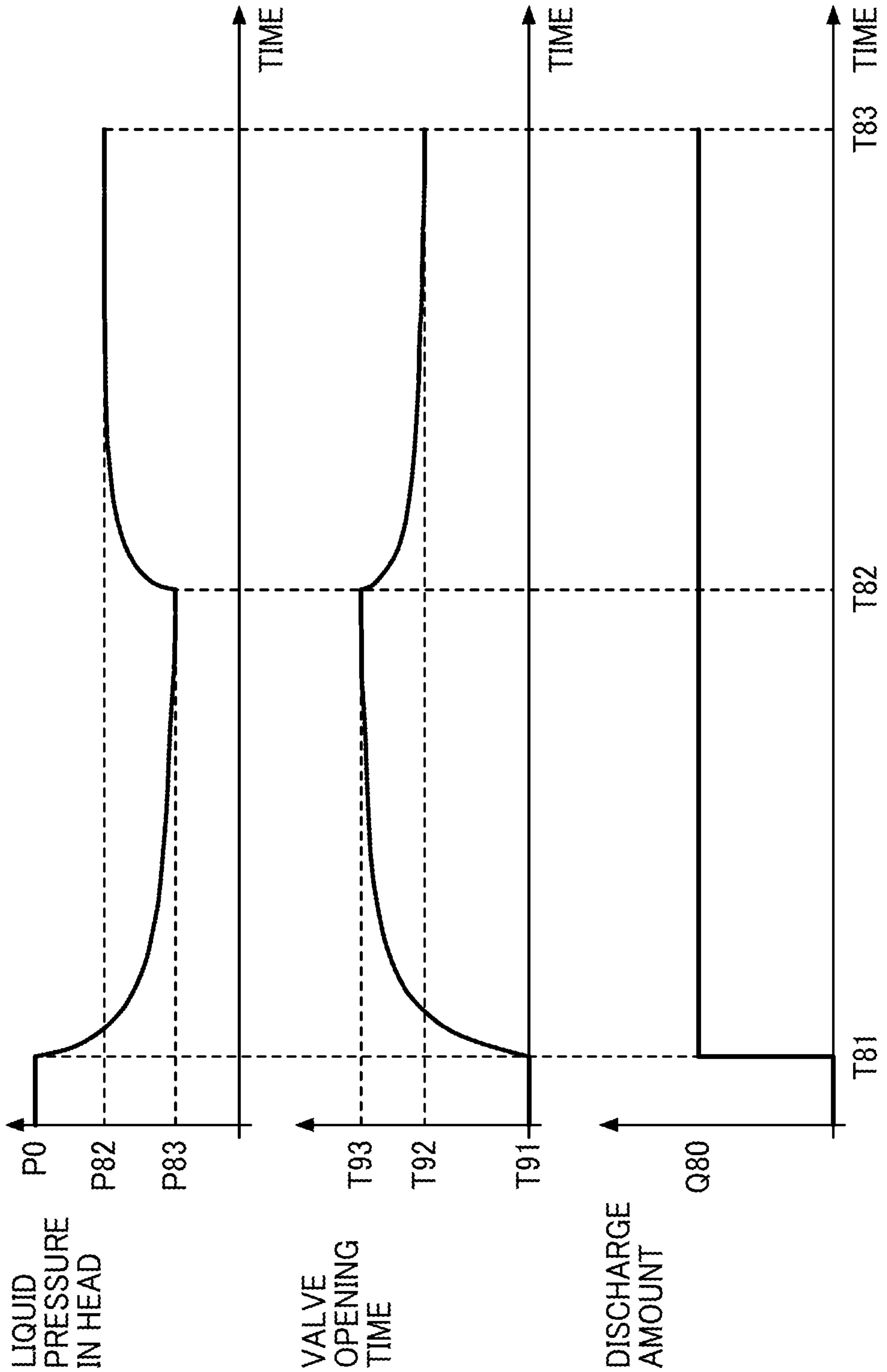
FIG. 12 is graphs illustrating another example of the liquid pressure in the discharge head, the valve opening time, and the discharge amount.

Examples of the liquid pressure in the head, the valve opening time, and the discharge amount are described with reference to FIGS. 11 and 12. FIGS. 11 and 12 are graphs illustrating examples of the liquid pressure in the head, the valve opening time, and the discharge amount. The example illustrated in FIG. 11 is different from the example illustrated in FIG. 12. In the example illustrated in FIG. 11, the number of nozzles to be driven increases, and in the example illustrated in FIG. 12, the number of nozzles to be driven decreases.

In FIGS. 11 and 12, the temporal change in the liquid pressure in the head is illustrated at the top, a temporal change in the valve opening time is illustrated in the middle, and a temporal change in the discharge amount is illustrated in the bottom. The temporal change is a change over time.

In the example illustrated in FIG. 11, the discharge head 10 starts discharging the paint 3 at a time T61, and the number of nozzles to be driven increases from a first number of nozzles to be driven to a second number of nozzles to be driven at a time T62. The second number of nozzles to be driven is larger than the first number of nozzles to be driven.

The liquid pressure in the head decreases from the pressure P0 immediately after the start of discharge, and reaches a pressure P62 at a time T62. The valve opening time increases from a valve opening time T71 immediately after the start of discharge, and reaches a valve opening time T72 at the time T62. The valve opening time control unit 231 increases the valve opening time with a decrease in the liquid pressure in the head.

The controller 500 increases the number of nozzles to be driven at the time T62. After the number of nozzles to be driven increases, the liquid pressure in the head decreases from the pressure P62 and reaches a pressure P63 at a time T63. The pressure P63 is lower than the pressure P62. After the number of nozzles to be driven increases, the valve opening time increases from the valve opening time T72 and reaches a valve opening time T73 at the time T63. The valve opening time control unit 231 increases the valve opening time with the decrease in the liquid pressure in the head.

The controller 500 increases the valve opening time with the decrease in the liquid pressure in the head. As a result, the discharge amount becomes the same value of a discharge amount Q60. The liquid discharge apparatus 200 discharges the constant discharge amount Q60 of the paint 3 regardless of the change in the liquid pressure in the head. The liquid discharge apparatus 200 discharges the constant discharge amount Q60 regardless of a change in the number of nozzles to be driven. As described above, the liquid discharge apparatus 200 can discharge the constant discharge amount of the paint 3 immediately after the start of discharge, thereby keeping the coating quality uniform.

In the example illustrated in FIG. 12, the discharge head 10 starts discharging the paint 3 at a time T81, and the number of nozzles to be driven decreases from the second number of nozzles to be driven to the first number of nozzles to be driven at a time T82. The first number of nozzles to be driven is smaller than the second number of nozzles to be driven. The liquid pressure in the head decreases from the pressure P0 immediately after the start of discharge, and reaches a pressure P83 at a time T82. The valve opening time increases from a valve opening time T91 immediately after the start of discharge, and reaches a valve opening time T93 at the time T82. The valve opening time control unit 231 increases the valve opening time with the decrease in the liquid pressure in the head.

The controller 500 decreases the number of nozzles to be driven at the time T82. After the number of nozzles to be driven decreases, the liquid pressure in the head increases from the pressure P83 and reaches a pressure P82 at the time T83. The pressure P82 is higher than the pressure P83. After the number of nozzles to be driven decreases, the valve opening time decreases from the valve opening time T93 and reaches a valve opening time T92 at the time T83. The valve opening time control unit 231 shortens (decreases) the valve opening time with an increase in the liquid pressure in the head.

The controller 500 increases the valve opening time with the decrease in the liquid pressure in the head, and decreases the valve opening time with the increase in the liquid pressure in the head. As a result, the discharge amount becomes the same value of a discharge amount Q80. The liquid discharge apparatus 200 discharges the constant discharge amount Q80 of the paint 3 regardless of the change in the liquid pressure in the head. The liquid discharge apparatus 200 discharges the constant discharge amount Q80 regardless of the change in the number of nozzles to be driven. As described above, the liquid discharge apparatus 200 can discharge the constant discharge amount of the paint 3 immediately after the start of discharge, thereby keeping the coating quality uniform.

Example in which the Number of Nozzles to be Driven Decreases

A description is given below of the example in which the number of nozzles to be driven decreases. For example, when a target coating area of the object 3000 decreases in a scanning direction of the discharge head 10, the number of nozzles to be driven decreases. For example, when the liquid discharge apparatus 200 coats a roof of the object 3000 (e.g., the automobile) and then coats a pillar of the object 3000 with the paint 3, the target coating area decreases in the scanning direction, and the number of nozzles to be driven decreases. For example, when the target coating area decreases from a large area to a small area that is narrower than a coating width of the discharge head 10, the number of nozzles to be driven decreases. The "coating width" is a length to which the discharge head 10 can apply the paint 3 in the direction intersecting the scanning direction in the target coating area. When the last portion of the target coating area has an area narrower than the coating width, the number of nozzles to be driven decreases. The controller 500 can calculate the number of nozzles to be driven while scanning the object 3000 with the discharge head 10.

The "number of nozzles to be driven" refers to the number of nozzle holes N from which the paint 3 is discharged to coat the object 3000 with the paint 3. When the target coating area does not change in the scanning direction, the number of nozzles to be driven does not change. In the scanning direction, when the target coating area increases, the number of nozzles to be driven increases, and when the target coating area decreases, the number of nozzles to be driven decreases. The “target coating area” refers to an area of the object 3000 to be coated.

For example, when some of the multiple nozzle holes N are unusable under a certain coating condition, the number of nozzles to be driven is limited. For example, some of the multiple nozzle holes N may be unusable depending on coating conditions such as a gap and an incident angle of the discharge head 10. The “gap” is a gap between the object 3000 and the nozzle hole N. The “incident angle” is an incident angle of a droplet of the paint 3 with respect to the surface of the object 3000 to be coated.

For example, when the liquid discharge apparatus 200 coats a portion of the object 3000 having a large change in curvature, such as an inner plate of the body of the automobile, the gap or the incident angle may become out of tolerance to coat the portion of the object 3000 from a small curvature to a large curvature. In such a case, the number of nozzles to be driven decreases.

Example in which the Number of Nozzles to be Driven Increases

A description is given below of the example in which the number of nozzles to be driven increases. For example, the number of nozzles to be driven increases from 0 to an initial number of nozzles to be driven at a start of printing. The “start of printing” may be the “start of coating” or the “start of discharge.”

For example, when some of the multiple nozzle holes N are unusable under a certain coating condition, the unusable nozzle holes N may become usable if the coating condition is changed. In such a case, since the unusable nozzle holes N becomes usable, the number of nozzles to be driven increases.

For example, when the liquid discharge apparatus 200 coats a portion of the object 3000 such as the inner plate of the body of the automobile having a large curvature, the number of the nozzle holes N to be driven may increase to coat a portion having a small curvature next to the portion having the large curvature. The controller 500 changes the valve opening time based on the number of nozzles to be driven to make the discharge amount constant.

The liquid discharge apparatus 200 according to the present embodiment changes the valve opening time of the valve 12 based on the liquid pressure supplied to the discharge head 10. As a result, the liquid discharge apparatus 200 can reduce a fluctuation of the discharge amount of the paint 3 discharged from the nozzle hole N, thereby keeping the coating quality uniform. The “liquid pressure supplied to the discharge head” is a pressure of the paint 3 (liquid) supplied to the discharge head.

The liquid discharge apparatus 200 changes the valve opening time of the valve 12 based on the number of nozzles to be driven, that is, the number of the nozzle holes N from which the paint 3 (liquid) is discharged during coating (during printing). As a result, the liquid discharge apparatus 200 alleviates an influence of the change in the number of nozzles to be driven and reduce a fluctuation of the discharge amount of the paint 3 discharged from the nozzle hole N, thereby keeping the coating quality uniform.

In the liquid discharge apparatus 200, the controller 500 causes the discharge head 10 to discharge the paint 3 from the nozzle hole N to a first area at a first liquid pressure as a first discharge operation, and discharge the paint 3 from the nozzle hole N to a second area at a second liquid pressure as a second discharge operation. The liquid pressure in the discharge head 10 may decrease from the first liquid pressure to the second liquid pressure and may increase from the second liquid pressure to the first liquid pressure. The “first liquid pressure” and the “second liquid pressure” may be arbitrary values.

In the liquid discharge apparatus 200, the controller 500 causes the valve driver 13 to drive the valve 12 to open the nozzle hole N for a first valve opening time to discharge the paint 3 onto the first area of the object 3000 at the first pressure of the paint 3 (i.e., the first pressure of the head pressure) and cause the valve driver 13 to drive the valve 12 to open the nozzle hole N for a second valve opening time longer than the first valve opening time to discharge the paint 3 onto the second area of the object 3000 at the second pressure (i.e., the second pressure of the head pressure) lower than the first pressure of the head pressure. The liquid discharge apparatus 200 adjusts (changes) the valve opening time based on the pressure of the paint 3 supplied to the discharge head 10 to make the discharge amount constant.

In the liquid discharge apparatus 200, the controller 500 applies a drive waveform having a voltage duty to the valve driver 13 to drive the valve 12 and change the voltage duty to change the valve opening time. The controller 500 of the liquid discharge apparatus 200 applies, for example, the drive waveform illustrated in FIG. 8 to the valve driver 13 to drive the valve 12 to open and close the nozzle hole N. The voltage duty is a pulse width of the second drive voltage V2 with respect to one drive cycle S12. The controller 500 changes the pulse width of the drive waveform based on the liquid pressure supplied to the discharge head 10 to change the valve opening time. The controller 500 changes the pulse width of the drive waveform based on the number of nozzles to be driven to change the valve opening time.

In the liquid discharge apparatus 200, the controller 500 shortens a switching interval of the valve 12 to open and close the nozzle hole N (i.e., one drive cycle S1) with an increase in a change rate of the liquid pressure of the paint 3 in the nozzle hole N (i.e., the head pressure) over time.

For example, as illustrated in FIGS. 11 and 12, the change rate of the liquid pressure in the head varies with time. The slope of the graph indicates the change rate of the liquid pressure in the head over time. The controller 500 of the liquid discharge apparatus 200 shortens the switching interval of the valve opening time when the change rate of the liquid pressure over time is large compared to when the change rate of the liquid pressure over time is small. Thus, the controller 500 can adjust the change rate of the valve opening time corresponding to the change rate of the liquid pressure in the head. When the change rate of the liquid pressure in the head over time is large, the controller 500 increases the change rate of the valve opening time, and when the change rate of the liquid pressure in the head over time is small, the controller 500 decreases the change rate of the valve opening time. The controller 500 changes the length of valve opening time T10 in the drive waveform illustrated in FIG. 8 to adjust the change rate of the valve opening time. The controller 500 changes the length of one drive cycle S1 of the drive waveform to adjust the change rate of the valve opening time.

The present disclosure is not limited to the above-described embodiment, and numerous additional modifications and variations are possible without departing from or changing the technical idea of the present disclosure.

Embodiments of the present disclosure includes the liquid discharge method performed by the above described liquid discharge apparatus 200, and a non-transitory storage medium storing a plurality of instructions which, when executed by one or more processors, causes the processors to perform the liquid discharge method.

In the above-described embodiment, the liquid discharge apparatus 200 including the discharge head 10 having the multiple nozzle holes N has been described. However, the present disclosure can be applied to the discharge head 10 having one nozzle hole N to control the "valve opening time."

As a result, according to an embodiment of the present disclosure, a liquid application quality to the object can be enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a liquid discharge head having a nozzle hole from which a liquid is discharged, the liquid discharge head including:

a valve configured to open and close the nozzle hole; and a valve driver configured to drive the valve; and circuitry configured to:

cause the valve driver to drive the valve to open the nozzle hole for a valve opening time to discharge the liquid onto an object;

increase the valve opening time in response to a decrease in a head pressure applied to the liquid in the liquid discharge head; and shorten a switching interval of the valve to open and close the nozzle hole with an increase in a change rate of the head pressure over time.

2. The liquid discharge apparatus according to claim 1, wherein the circuitry is further configured to:

cause the valve driver to drive the valve to open the nozzle hole for a first valve opening time to discharge the liquid onto a first area of the object at a first pressure of the head pressure; and cause the valve driver to drive the valve to open the nozzle hole for a second valve opening time longer than the first valve opening time to discharge the liquid onto a second area of the object at a second pressure lower than the first pressure of the head pressure.

3. The liquid discharge apparatus according to claim 1, wherein the circuitry is further configured to:

apply a drive waveform having a voltage duty to the valve driver to drive the valve; and change the voltage duty to change the valve opening time.

4. A liquid discharge method comprising:

driving a valve to open and close a nozzle hole for a valve opening time to discharge a liquid onto an object;

increasing the valve opening time in response to a decrease in a head pressure applied to the liquid to be discharged from the nozzle hole; and shortening a switching interval of the valve to open and close the nozzle hole with an increase in a change rate of the head pressure over time.

5. A non-transitory storage medium storing a plurality of instructions which, when executed by one or more processors, causes the processors to perform a method, comprising:

driving a valve to open and close a nozzle hole for a valve opening time to discharge a liquid onto an object;

increasing the valve opening time in response to a decrease in a head pressure applied to the liquid to be discharged from the nozzle hole; and shortening a switching interval of the valve to open and close the nozzle hole with an increase in a change rate of the head pressure over time.

* * * * *